US011505655B2

(12) United States Patent
Tashiro et al.

(10) Patent No.: US 11,505,655 B2
(45) Date of Patent: Nov. 22, 2022

(54) MODIFIED LIGNIN MANUFACTURING METHOD, MODIFIED LIGNIN, AND MODIFIED LIGNIN-INCLUDING RESIN COMPOSITION MATERIAL

(71) Applicant: IDEMITSU KOSAN CO., LTD., Tokyo (JP)

(72) Inventors: Hironori Tashiro, Sodegaura (JP); Yoshihito Koyama, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 16/636,600

(22) PCT Filed: Aug. 10, 2018

(86) PCT No.: PCT/JP2018/030113
§ 371 (c)(1),
(2) Date: Feb. 4, 2020

(87) PCT Pub. No.: WO2019/031610
PCT Pub. Date: Feb. 14, 2019

(65) Prior Publication Data
US 2020/0377672 A1    Dec. 3, 2020

(30) Foreign Application Priority Data

Aug. 10, 2017  (JP) .............................. JP2017-156187

(51) Int. Cl.
*C08H 7/00*    (2011.01)
*C08L 97/00*   (2006.01)

(52) U.S. Cl.
CPC .............. *C08H 6/00* (2013.01); *C08L 97/005* (2013.01)

(58) Field of Classification Search
CPC ................................... C08H 6/00; C07G 1/00
See application file for complete search history.

(56) References Cited

U.S. PATENT DOCUMENTS

| 10,259,903 B2 | 4/2019 | Pietarinen et al. | |
| 2011/0262984 A1* | 10/2011 | Nguyen | C12P 7/10 435/165 |
| 2015/0041083 A1* | 2/2015 | Yoshikawa | D21H 17/06 162/19 |
| 2015/0144829 A1* | 5/2015 | Grunbauer | C08G 18/6492 252/62 |
| 2016/0215143 A1* | 7/2016 | Gotou | C08L 61/04 |
| 2017/0253740 A1* | 9/2017 | Murai | C08K 5/0025 |
| 2017/0275461 A1* | 9/2017 | Yamao | C08L 63/00 |
| 2018/0215878 A1* | 8/2018 | Okano | C08L 101/00 |
| 2019/0211207 A1* | 7/2019 | Koyama | C08L 97/00 |
| 2020/0181410 A1* | 6/2020 | Tashiro | C08K 5/07 |

FOREIGN PATENT DOCUMENTS

| CN | 103145938 A | 6/2013 |
| CN | 103554396 A | 2/2014 |
| CN | 103554400 A | 2/2014 |
| CN | 106380887 A | 2/2017 |
| JP | 2004115736 A | * 4/2004 |
| JP | 2009-084320 A | 4/2009 |
| JP | 2012-082255 A | 4/2012 |
| JP | 2012-102297 A | 5/2012 |
| JP | 2012102297 A | * 5/2012 |
| JP | 2013-199561 A | 10/2013 |
| JP | 2014-037354 A | 2/2014 |
| JP | 5671430 B2 | 2/2015 |
| JP | 2015-519452 A | 7/2015 |
| JP | 2016-540058 A | 12/2016 |
| WO | WO-2015/147165 A1 | 10/2015 |
| WO | WO-2016/043218 A1 | 3/2016 |

OTHER PUBLICATIONS

Ono et al. (Wood Adhesives from Phenolysis Lignin, ACS Symposium Series; American Chemical Society: Washington, DC, 1989) (Year: 1989).*
Guo et al. (Bioresource Technology, 135, 2013, 738-741) (Year: 2013).*
Lee et al. (International Journal of Biological Macromolecules 72, 2015, 1056-1062) (Year: 2015).*
Machine Translation of JP-2004115736-A, 2021 (Year: 2021).*
International Searching Authority, "International Search Report," issued in connection with International Patent Application No. PCT/JP2018/030113, dated Nov. 6, 2018.
International Searching Authority, "Written Opinion," issued in connection with International Patent Application No. PCT/JP2018/030113, dated Nov. 6, 2018.
Extended European Search Report dated Mar. 12, 2021 for corresponding European Patent Application No. 18845245.2.
Lee et al., "Isolation and characterization of lignin from the oak wood bioethanol production residue for adhesives", International Journal of Biological Macromolecules, pp. 1056-1062, vol. 72, Oct. 29, 2014.
Office Action dated Aug. 4, 2021 issued in a corresponding Chinese Patent Application No. 201880051519.9, (34 pages).
Office Action dated Aug. 6, 2021 issued in a corresponding Indian Patent Application No. 202047005155, (5 pages).
Yan, "Study on lignin phenolation and use in lignin-based polyurethane", Chinese Doctoral Dissertation & Master's Thesis Full-text Database (Master), Engineering Science and Technology I, pp. 7, 11-12, 14-16 and 23-24, Mar. 15, 2014 (Machine Translation).

(Continued)

*Primary Examiner* — Liam J Heincer
(74) *Attorney, Agent, or Firm* — Foley & Lardner LLP

(57) ABSTRACT

A method for producing a modified lignin, including reacting one or more kind of a second generation ethanol fermentation residue and a second generation ethanol saccharification residue, with a phenol compound, a modified lignin having a ratio ((2H+G)/S) of a total of twice of a relative existence ratio H (%) of an H-type skeleton and a relative existence ratio G (%) of a G-type skeleton with respect to a relative existence ratio S (%) of an S-type skeleton, obtained from integrated values measured by $^{31}$P-NMR, of 2.5 or more, and an existence ratio of an aliphatic hydroxy group obtained by the same method of less than 20%, and a modified lignin-containing resin composition material.

12 Claims, No Drawings

(56) References Cited

OTHER PUBLICATIONS

Office Action dated Nov. 30, 2021 issued in a corresponding Australian Patent Application No. 2018313534, (3 pages).
Chinese Office Action issued in corresponding Chinese Application No. 201880051519.9 dated Apr. 8, 2022.
Japanese Office Action issued in corresponding Japanese Application No. JP2019535729 dated Apr. 5, 2022.
Office Action issued in corresponding Chinese Patent Application No. 201880051519.9 dated Aug. 15, 2022.
Office Action issued in corresponding Brazilian Patent Application No. 112020002458-9 dated Jun. 13, 2022.
Office Action issued in corresponding Japanese Patent Application No. 2019-535729, dated Oct. 4, 2022.

\* cited by examiner

MODIFIED LIGNIN MANUFACTURING METHOD, MODIFIED LIGNIN, AND MODIFIED LIGNIN-INCLUDING RESIN COMPOSITION MATERIAL

CROSS-REFERENCE TO RELATED APPLICATIONS

The present application claims priority under 37 U.S.C. § 371 to International Patent Application No. PCT/JP2018/030113, filed Aug. 10, 2018, which claims priority to and the benefit of Japanese Patent Application No. 2017-156187, filed on Aug. 10, 2017. The contents of these applications are hereby incorporated by reference in their entireties.

TECHNICAL FIELD

The present invention relates to a method for producing a modified lignin, a modified lignin, and a modified lignin-containing resin composition material.

BACKGROUND ART

Applications of carbon-neutral plant-derived materials to plastic materials have been expected from the standpoint of the greenhouse gas mitigation. The plant-derived materials include cellulose, hemicellulose, lignin, and the like, which are derived mainly from sugars. Among these, lignin is expected to have useful applications as a plastic material due to the aromatic rings, aliphatic hydroxy groups, and aromatic hydroxy groups contained therein. However, lignin has two issues, i.e., a convenient and economically efficient isolation and purification method of lignin has not yet been established, and lignin is substantially not dissolved in a solvent, is poor in handleability due to the high softening point thereof, and is poor in reactivity with the existing plastic materials, and therefore substantially no application of lignin as a plastic material has been found out. Accordingly, for making lignin favorable as a plastic material, techniques for performing suitable isolation and purification of lignin, modification thereof, and applications of the modified lignin have been studied.

As for the isolation of lignin from a biomass residue, the isolation of lignin from black liquor, which is a residue in pulp industries, has been exemplified for a long time. However, a black liquor contains a large amount of contaminants, such as inorganic salts, and thus has been applied to a material having low industrial value, such as a fuel. In recent years, as described in PTL 1, such an approach has been known that lignin contained in a black liquor is isolated through modification, such as reaction with PEG (polyethylene glycol), so as to enhance the industrial value.

Furthermore, as for the application of isolated lignin, for example, PTL 2 describes techniques relating to a modified lignin imparted with reactivity through introduction of a benzoxazine skeleton to lignin without decreasing the molecular weight of lignin, and a molding material enhancing the mechanical strength and the like of a molded article with the modified lignin contained therein.

PTL 3 describes a technique of enhancing the reactivity of lignin in such a manner that lignin is phenolated through reaction with a phenol compound in the presence of a catalyst, and then heated with an alkali to form an alkalified lignin, to which an aldehyde compound is further added to form a hydroxymethylated lignin, and a technique of applying the lignin having enhanced in reactivity to a binder composition.

PTL 4 describes a phenol-modified lignin resin and the like improved in resin strength through enhancement of the curability by a production method of reacting lignin with a phenol compound and an aldehyde compound in the presence of an acid.

CITATION LIST

Patent Literatures

PTL 1: JP 2015-519452 A
PTL 2: Japanese Patent No. 5,671,430
PTL 3: JP 2016-540058 A
PTL 4: WO 2015/147165

SUMMARY OF INVENTION

Technical Problem

In the case where the greenhouse gas mitigation is aimed by applying lignin to resin materials as described above, there is an issue that the following four requirements are necessarily satisfied, i.e., the lignin (i) can be available at low cost, (ii) can be provided in a large quantity, (iii) can be readily mixed with a resin, and (iv) can be readily reacted with a resin. However, sulfide lignin, kraft lignin, and soda lignin obtained form a black liquor or the like emitted from the pulp industries, which are currently assumed to be a lignin raw material, can satisfy the requirements (i) and (ii), but sulfide lignin is difficult to satisfy the requirement (iv) due to the high sulfur content thereof and may be inferior in the requirement (iii) due to the water solubility thereof. Kraft lignin and soda lignin also cannot satisfy the requirements (iii) and (iv) due to the high molecular weight thereof. In recent years, an organo-soluble lignin soluble in an organic solvent has been reported (one example of which is the PEG lignin described in PTL 1) and is said to address the issue, but there is a problem in solution of the requirements (i) and (ii).

Furthermore, in addition to the aforementioned issue in supply of lignin, the following issue has occurred. According to the related art, the curing reactivity of a material containing lignin can be enhanced to a certain extent. However, in the case where a high quality material capable of replacing a metal member is assumed, the measure of the related art is insufficient in capability of the molded article, for example, the flexural strength. Accordingly, there is a demand of further improving the reactivity of lignin.

Under the circumstances, an object of the present invention is to provide a method for producing a modified lignin that has an enhanced reactivity with an existing plastic material, from an inexpensive raw material present in large quantity, such as a second generation ethanol fermentation residue and a second generation ethanol saccharification residue, which are biomass residues, and the modified lignin, and to provide a modified lignin-containing resin composition material that is capable of providing a molded article having an enhanced properties, such as an enhanced flexural strength.

Solution to Problem

As a result of the earnest investigations for solving the problems, the present inventors have found that the problems can be solved in such a manner that a phenol compound is reacted with a second generation ethanol fermentation residue, a second generation ethanol saccharification residue, or the like, so as to isolate lignin as a modified lignin in a high yield, and simultaneously to achieve the skeletal ratio conversion of the basic skeleton of lignin, the decrease of the aliphatic hydroxy groups, and the decrease of the molecular weight, in one reaction.

Specifically, the present invention relates to the following.

[1] A method for producing a modified lignin, including reacting one or more kind of a second generation ethanol fermentation residue and a second generation ethanol saccharification residue, with a phenol compound.

[2] A modified lignin having a ratio ((2H+G)/S) of a total of twice of a relative existence ratio H (%) of an H-type skeleton and a relative existence ratio G (%) of a G-type skeleton with respect to a relative existence ratio S (%) of an S-type skeleton, obtained from integrated values measured by $^{31}$P-NMR, of 2.5 or more, and an existence ratio of an aliphatic hydroxy group with respect to a total of existence ratios of the aliphatic hydroxy group and an aromatic hydroxy group, obtained from integrated values measured by $^{31}$P-NMR, of less than 20%.

[3] A modified lignin-containing resin composition material containing a modified lignin that is produced by the method for producing a modified lignin, or the modified lignin.

Advantageous Effects of Invention

According to the present invention, a method for producing a modified lignin can be provided that can produce a modified lignin in a high yield from an inexpensive raw material, such as a second generation ethanol fermentation residue and a second generation ethanol saccharification residue, which are biomass residues. Furthermore, the modified lignin obtained has an enhanced reactivity with an existing plastic material, and can readily mixed and reacted with an existing resin, and therefore a modified lignin-containing resin composition material can be provided that is capable of providing a molded article having an enhanced properties, such as an enhanced flexural strength.

DESCRIPTION OF EMBODIMENTS

Method for Producing Modified Lignin and Modified Lignin

The method for producing a modified lignin of the present invention includes reacting one or more kind of a second generation ethanol fermentation residue and a second generation ethanol saccharification residue, with a phenol compound. The second generation ethanol fermentation residue and the second generation ethanol saccharification residue contain lignin, and the lignin, the modified lignin of the present invention, the second generation ethanol fermentation residue, the second generation ethanol saccharification residue, the phenol compound, the reaction process step, and the like will be described below.

Lignin

Lignin is a polymer compound formed through polymerization of three kinds of lignin monomers, which are p-hydroxy cinnamic alcohol compounds, and has a basic skeleton represented by the following formula (2).

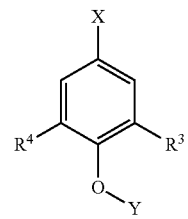

(2)

In the formula (2), $R^3$ and $R^4$ as substituents each represent a hydrogen atom or a methoxy group. The skeleton having both $R^3$ and $R^4$ that are hydrogen atoms is referred to as a p-hydroxyphenyl nucleus (H-type skeleton), the skeleton having any one of $R^3$ and $R^4$ that is a hydrogen atom is referred to as a guaiacyl nucleus (G-type skeleton), and the skeleton having both $R^3$ and $R^4$ that are not a hydrogen atom is referred to as a syringyl nucleus (S-type skeleton).

In the formula (2), X represents a bond to a carbon element, and Y represents a bond to a hydrogen or carbon atom.

In the basic skeleton of lignin, the carbon atoms bonded to $R^3$ and $R^4$ each are a reactive site having high reactivity (which may be hereinafter referred simply to as a "reactive site"), but the reactivity of the carbon atom becomes poor in the case where $R^3$ or $R^4$ is a methoxy group. Accordingly, for reacting lignin, $R^3$ and $R^4$ are demanded to be hydrogen atoms.

Lignin also contains an aliphatic moiety in addition to the aforementioned aromatic moiety, and a hydroxy group existing in the aliphatic moiety is poor in oxidation stability (changing to an aldehyde or a carboxylic acid through oxidation) and therefore is preferably as smaller as possible in amount, for improving the reactivity with an existing plastic material.

Furthermore, by decreasing the molecular weight without decreasing the softening point largely, the mixing capability can be enhanced, and the reactivity with an existing plastic material can be enhanced.

Consequently, lignin that has a small amount of an aliphatic hydroxy group, has a large amount of the two kinds of skeletons having high reactivity, i.e., the H-type skeleton and the G-type skeleton, and more preferably has a molecular weight decreased without decreasing the softening point largely has high reactivity and is favorable as a plastic material.

However, the existence ratios of the types of basic skeletons and the aliphatic hydroxy group vary depending on the kind of the raw material plant of lignin. Furthermore, natural lignin is intrinsically a macromolecule having a molecular weight that cannot be measured, and thus has a defect that the softening point is largely decreased when the molecular weight thereof is decreased by the existing separation measure.

For example, in a woody biomass, lignin derived from broad-leaf trees contains the G-type skeleton and the S-type skeleton, and lignin derived from coniferous trees contains the G-type skeleton and the S-type skeleton, in which the G-type skeleton exists in a larger amount. Lignin derived from broad-leaf trees and coniferous trees contains substantially no H-type skeleton.

Lignin derived from an herbaceous biomass contains the H-type skeleton, the G-type skeleton, and the S-type skeleton, in which the existence ratio of the H-type skeleton is small.

Lignin derived from coniferous trees contains a large amount of the aliphatic hydroxy group, and the amount of the aliphatic hydroxy group is decreased from lignin derived from broad-leaf trees to herbaceous lignin in this order.

Accordingly, for enhancing the reactivity of lignin, it is necessary to modify lignin in such a method for decreasing the molecular weight that increases the existence ratios of the H-type skeleton and the G-type skeleton, decreases the aliphatic hydroxy group, and does not largely decrease the softening point.

Modified Lignin

The modified lignin of the present invention has a ratio ((2H+G)/S) of the total of twice of the relative existence ratio H (%) of the H-type skeleton and the relative existence ratio G (%) of the G-type skeleton with respect to the relative existence ratio S (%) of the S-type skeleton, obtained from integrated values measured by $^{31}$P-NMR, of 2.5 or more, and an existence ratio of the aliphatic hydroxy group with respect to the total of the existence ratios of the aliphatic hydroxy group and the aromatic hydroxy group, obtained similarly from integrated values measured by $^{31}$P-NMR, of less than 20%. The modified lignin of one embodiment of the present invention preferably has a number average molecular weight of less than 1,000 and a softening point of 90° C. or more, through the decrease of molecular weight.

Ratio ((2H+G)/S) of Existence Ratios of Reactive Site (H-type Skeleton×2+G-Type Skeleton) and Non-Reactive Site (S-Type Skeleton) and Existence Ratio of Aliphatic Hydroxy Group In lignin in a second generation ethanol fermentation residue and a second generation ethanol saccharification residue, $R^3$ and $R^4$ become hydrogen atoms to increase the reactive site of the modified lignin, the aliphatic hydroxy group is decreased, and the molecular weight is decreased without decreasing the softening point largely, through the substitution reaction described later in the production method of the present invention.

While the H-type has two reactive sites, and the G-type has one reactive site, as described above, the modified lignin of the present invention has a large amount of reactive sites as shown by the ratio ((2H+G)/S) and has good reactivity.

However, although the analysis has revealed that lignin derived from coniferous trees, such as cedar trees, has a ratio ((2H+G)/S) of 3 or more before the modification, the aliphatic hydroxy group exists in 20% or more with respect to the total hydroxy group (i.e., the total of the existence ratios of the aliphatic hydroxy group and the aromatic hydroxy group), and therefore the lignin is not favorable as a plastic material.

Accordingly, with the ratio that is less than 2.5 or the amount of the aliphatic hydroxy group of 20% or more, the modified lignin is insufficient in reactivity and cannot be favorable as a plastic material, and cannot be expected to provide a molded article having an enhanced properties, such as an enhanced flexural strength.

On the other hand, the modified lignin of the present invention has a ratio ((2H+G)/S) of 2.5 or more and an existence ratio of the aliphatic hydroxy group with respect to the total of the existence ratios of the aliphatic hydroxy group and the aromatic hydroxy group of less than 20%. The ratio ((2H+G)/S) is preferably 2.8 or more, more preferably 3.0 or more, further preferably 4.0 or more, still further preferably 5.0 or more, still more further preferably 6.0 or more, and still more further preferably 7.0 or more, from the standpoint of the further enhancement of the reactivity of the modified lignin and the achievement of a molded article having an enhanced properties, such as an enhanced flexural strength. The existence ratio of the aliphatic hydroxy group is preferably less than 15%, more preferably less than 12%, and further preferably less than 10%, from the same standpoint.

The relative existence ratios of the S-type skeleton, the H-type skeleton, and the G-type skeleton, and the amount of the aliphatic hydroxy group are values that are obtained from integrated values measured by $^{31}$P-NMR, and the details of the $^{31}$P-NMR measurement are described in Magnetic Resonance in Chemistry, vol. 33, pp 375-382 (1995). In the present invention, more specifically, these values can be measured by the methods described in the examples shown later.

Decrease of Molecular Weight and Softening Point

The molecular weight of the modified lignin of the present invention is decreased by the modification of the molecular chain of $R^3$ and $R^4$ through the substitution reaction described later. Accordingly, lignin can be extracted as the modified lignin in a high efficiency through the decrease of the molecular weight, is simultaneously enhanced in the mixing capability (i.e., the kneading capability and the agitation capability) with the other plastic material, and is expected to provide a molded article having an enhanced properties, such as an enhanced flexural strength.

The modified lignin of the present invention necessarily has the phenol compound inserted to the substitution site, and therefore the softening point is not decreased largely even though the molecular weight is decreased. Accordingly, the softening point of the modified lignin of the present invention may be preferably 90° C. or more, more preferably 130° C. or more, and further preferably 160° C. or more. With the softening point of 90° C. or more, a resin composition material containing the modified lignin may be prevented from suffering problems including blister after the molding and post hardening. The softening point of the modified lignin is preferably 200° C. or less, more preferably 190° C. or less, further preferably 180° C. or less, and still further preferably 170° C. or less. With the softening point of 200° C. or less, a resin composition containing the modified lignin can be more readily handled.

The modified lignin of the present invention, for example, preferably has a weight average molecular weight of 2,100 or more and 2,700 or less in the case where the number average molecular weight thereof is 800 or more and 1,200 or less, preferably has a weight average molecular weight of 1,200 or more and less than 2,100 in the case where the number average molecular weight thereof is 600 or more and less than 800, and preferably has a weight average molecular weight of 700 or more and less than 1,200 in the case where the number average molecular weight thereof is 400 or more and less than 600.

The modified lignin of the present invention, for example, generally has a molecular weight distribution (Mw/Mn) of approximately 1.2 to 3.2, preferably 1.3 to 2.7, more preferably 1.5 to 2.6, further preferably 1.5 to 2.5, and still further preferably 1.5 to 2.3.

The modified lignin of the present invention, for example, preferably has a softening point of 140° C. or more and 200° C. or less in the case where the number average molecular weight thereof is 800 or more and 1,200 or less, preferably has a softening point of 120° C. or more and 190° C. or less in the case where the number average molecular weight thereof is 600 or more and less than 800, preferably has a softening point of 100° C. or more and 170° C. or less in the case where the number average molecular weight thereof is 400 or more and less than 600, and preferably has a softening point of 90° C. or more and 170° C. or less in the case where the number average molecular weight thereof is 300 or more and less than 400.

The modified lignin of the present invention, for example, preferably has a softening point of 140° C. or more and 200° C. or less in the case where the number average molecular weight thereof is 800 or more and 1,200 or less and the weight average molecular weight thereof is 2,100 or more and 2,700 or less, preferably has a softening point of 120° C. or more and 190° C. or less in the case where the number average molecular weight thereof is 600 or more and less than 800 and the weight average molecular weight thereof is 1,200 or more and less than 2,100, preferably has a softening point of 100° C. or more and 170° C. or less in the case where the number average molecular weight thereof is 400 or more and less than 600 and the weight average molecular weight thereof is 700 or more and less than 1,200, and preferably has a softening point of 90° C. or more and 170° C. or less in the case where the number average molecular weight thereof is 300 or more and less than 400 and the weight average molecular weight thereof is 600 or more and less than 700. These values may be selected depending on the properties of the existing plastic material to be reacted, and thereby the reactivity of the modified lignin can be enhanced through the improvement of the mixing capability, expecting to provide a molded article having an enhanced properties, such as an enhanced flexural strength.

The number average molecular weight and the weight average molecular weight can be measured by the method described in the examples shown later.

The modified lignin of the present invention necessarily has the phenol compound inserted to the substitution site, as described above, and therefore in the method for producing a modified lignin of the present invention, the amount (mass) of the resulting modified lignin can be larger than the amount (mass) of lignin in one or more kind of the second generation ethanol fermentation residue and the second generation ethanol saccharification residue. The amount of lignin in one or more kind of the second generation ethanol fermentation residue and the second generation ethanol saccharification residue herein is the total amount of lignin in one or more kind of the second generation ethanol fermentation residue and the second generation ethanol saccharification residue.

Modification Degree

By the method for producing a modified lignin of the present invention, the modified lignin can be obtained that has an increased amount of the H-type skeleton and the G-type skeleton of the modified lignin and a decreased amount of the aliphatic hydroxy group, as compared to the basic skeleton of lignin contained in the second generation ethanol fermentation residue and the second generation ethanol saccharification residue, and thus has an increased amount of the reactive site. The resulting modified lignin has an improved mixing capability through the decrease of the molecular weight.

Specifically, by the method for producing a modified lignin of the present invention, the total of the reactive sites (2H+G) based on the relative existence ratio H (%) of the H-type skeleton and the relative existence ratio H (%) of the G-type skeleton obtained from integrated values measured by $^{31}$P-NMR can be increased, and the existence ratio of the aliphatic hydroxy group can be decreased, before and after the modification. The increment of the (2H+G) is preferably 4% or more.

Furthermore, by the method for producing a modified lignin of the present invention, in the content of lignin contained in the second generation ethanol fermentation residue and the second generation ethanol saccharification residue, 50% by mass or more thereof is preferably extracted as the modified lignin, 70% by mass or more thereof is more preferably extracted as the modified lignin, and 90% by mass or more thereof is further preferably extracted as the modified lignin. The calculation method of the content of lignin in the second generation ethanol fermentation residue and the second generation ethanol saccharification residue will be described specifically in the examples shown later.

Second Generation Ethanol Fermentation Residue and Second Generation Ethanol Saccharification Residue The second generation ethanol fermentation residue used as a raw material in the method for producing a modified lignin of the present invention is an herbaceous biomass as a plant biomass, and contains lignin.

The second generation ethanol fermentation residue and the second generation ethanol saccharification residue are residues obtained by removing cellulose and hemicellulose through saccharification or saccharification and fermentation from woody plants and herbaceous plants, which are an inedible plant biomass containing lignin.

Examples of the inedible plant biomass include a woody biomass and an herbaceous biomass. Examples of the woody biomass include coniferous trees and broad-leaf trees, such as cedar trees, Japanese cypress trees, false cypress trees, cherry trees, eucalyptus trees, beech trees, and bamboos.

Examples of the herbaceous biomass include trunks and empty fruit bunches of palm, fibers and seeds of palm fruits, bagasse (pomace remaining after extracting sugarcane and high-biomass sugarcane), cane tops (tops and leaves of sugarcane), energy cane, rice straws, wheat straws, cobs, stovers, and residues of corn (corn stovers, corn cobs, and corn hulls), Sorghum (including sweet sorghum) residues, seed coats and hulls of Jatropha curcas, cashew hulls, switchgrass, Erianthus, high-biomass-yield crops, and energy crops.

Among these, a herbaceous biomass is preferred, empty fruit bunches of palm, wheat straws, cobs, stovers, and residues of corn (corn stovers, corn cobs, and corn hulls), bagasse, cane tops, energy cane, and residues after the extraction of the useful components thereof are more preferred, and cobs, stovers, and residues of corn (corn stovers, corn cobs, and corn hulls), bagasse, cane tops, and energy cane are further preferred from the standpoint of the availability and the adequateness to the production method applied in the present invention. The useful components include hemicellulose, a carbohydrate, a mineral, and water.

Bagasse contains lignin in an amount of approximately 5 to 30% by mass. The lignin in bagasse contains all the H-type nucleus, the G-type nucleus, and the S-type nucleus as a basic skeleton.

The plant biomass may be used after crushing. The plant biomass may be in any form of blocks, chips, powder, and a hydrous material containing water.

Bagasse, corn stovers, and the like are subjected to such a treatment as an organosolv method, a pressurized hot water method, a steam blasting method, an ammonia treatment method, an ammonia blasting method, an acid treatment method, an alkali treatment method, an oxidation decomposition method, a thermal decomposition method, or a microwave heating method, preferably to such a treatment as an acid treatment method, an ammonia blasting method, or a steam blasting method, so as to isolate hemicellulose to the solution, and then cellulose is converted to glucose with an enzyme to isolate glucose to the solution, or in alternative, hemicellulose is not isolated but is saccharified along with cellulose to isolate to the solution, thereby resulting in the second generation ethanol saccharification residue as the remaining solid. In alternative, the saccharides are not isolated but are converted to ethanol through fermentation, and ethanol is isolated to the solution, thereby resulting in the second generation ethanol fermentation residue as the remaining solid. The second generation ethanol saccharification residue contains lignin as a major component, and also contains decomposition organic substances, catalysts, enzymes, ash components, cellulose, and the like. The second generation ethanol fermentation residue contains lignin as a major component, and also contains decomposition organic substances, catalysts, enzymes, yeasts, ash components, cellulose, and the like.

The extraction of lignin directly from the second generation ethanol fermentation residue or the second generation ethanol saccharification residue is not impossible since low molecular weight lignin is partially contained therein. However, according to the production method of the present invention, the decrease of the molecular weight of lignin occurs to enable the extraction of lignin in a high yield.

While more specific embodiments of the production method of the present invention will be described in the examples shown later, the production method may be as follows. With one or more kind of the second generation ethanol fermentation residue and the second generation ethanol saccharification residue used as a raw material, the pH of the hydrous raw material is controlled to an acidic state. A phenol compound is added thereto in an amount that is the same amount or more by weight as the amount of lignin contained in the raw material. The liquid mixture is heated, and water is removed in a hot state (water can be removed by providing a suitable oil-water separating device, such as a Dean-Stark apparatus, since the phenol compound has a high boiling point). After removing water, the liquid mixture is continuously heated for 1 to 2 hours. The heated liquid mixture contains insoluble matters, which are filtered out with 5C filter paper in a hot state. The filtered solid includes unreacted matters and inorganic contaminants. The filtrate is distilled under reduced pressure to remove the unreacted phenol compound. The phenol compound that cannot be completely removed through the distillation may be subjected depending on necessity to a procedure that the phenol compound is dissolved in acetone, and the product is reprecipitated from water as a poor solvent therefor. The solid matter thus isolated is the modified lignin having been modified. In the case where the phenol compound remaining after the distillation may not cause problem in the subsequent reaction, the product may be used without the distillation.

Phenol Compound

The phenol compound that is reacted with lignin in one or more kind of the second generation ethanol fermentation residue and the second generation ethanol saccharification residue (which may be hereinafter referred simply to as "lignin") is preferably a phenol compound having a hydrogen atom at at least one of the 2-position, the 4-position, and the 6-position as the positions of substituents with respect to the hydroxy group (which may be hereinafter referred simply to as a "phenol compound").

The phenol compound having the 2-position, the 4-position, or the 6-position (i.e., the o-position or the p-position) that is a hydrogen atom is particularly suitable as a receiver for the substituent in the substitution reaction, due to the orientation thereof, and the substituents of $R^3$ and $R^4$ in the basic skeleton of lignin represented by the formula (2) are transferred to the 2-position, the 4-position, or the 6-position of the phenol compound, by mixing the lignin and the phenol compound. Both $R^3$ and $R^4$ in lignin become hydrogen atoms through the substitution reaction, so as to form the modified lignin having an increased amount of the reaction sites.

Accordingly, the S-type skeleton is decreased, but the G-type skeleton and the H-type skeleton are increased in the lignin to improve the reactivity through the substitution reaction. Simultaneously, the molecular weight is decreased by the modification of the molecular chain of lignin through the substitution reaction, as described above, and thus the mixing capability of the modified lignin is improved in a high yield.

The phenol compound may be used alone or as a combination of two or more kinds thereof.

The phenol compound is preferably a compound represented by the following formula (1). With the use of the phenol compound, the number of the receiver for the substituent becomes at least three, enabling the favorable progress of the substitution reaction.

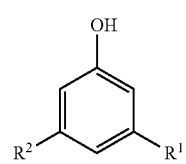

(1)

In the formula (1), $R^1$ and $R^2$ each independently represent a hydrogen atom, a hydroxy group, or an alkyl group having 1 to 15 carbon atoms, and $R^1$ and $R^2$ may be the same as or different from each other.

The alkyl group having 1 to 15 carbon atoms may be linear or branched. A linear or branched alkyl group having 1 to 15 carbon atoms is preferred, a linear or branched alkyl group having 1 to 5 carbon atoms is more preferred, and a linear alkyl group having 1 to 3 carbon atoms is further preferred.

Examples of the phenol compound represented by the formula (1) include phenol, resorcinol, phloroglucin, a 3-alkylphenol, such as m-cresol, 3-ethylphenol, and 3-propylphenol; a 5-alkylresorcinol, such as 5-methylresorcinol, 5-ethylresorcinol, and 5-propylresorcinol; and a 3,5-dialkylphenol, such as 3,5-dimethylphenol, 3-methyl-5-ethylphenol, and 3,5-diethylphenol.

At least one of $R^1$ and $R^2$ is preferably a hydroxy group from the standpoint that the phenol compound that has plural hydroxy groups has an increased acidity, from which the progress of the reaction without catalyst can be expected. Examples of the phenol compound of this type include resorcinol, phloroglucin, and a 5-alkylresorcinol (such as 5-methylresorcinol and 5-ethylresorcinol).

Reaction Process

Mass Ratio (Phenol Compound/Lignin)

In the production method of the present invention, the mass ratio of the phenol compound with respect to lignin in one or more kind of the second generation ethanol fermentation residue and the second generation ethanol saccharification residue (phenol compound/lignin) is generally approximately 0.1 to 15, and is preferably 0.3 to 15, more preferably 0.5 to 15, further preferably 1 to 15, still further preferably 1 to 13, still more further preferably 1 to 12, still more further preferably 1 to 10, still more further preferably 1 to 6, and still more further preferably 1 to 5. In the case where the mass ratio of the phenol compound with respect to the lignin is in the range, the substitution reaction can be performed favorably.

Acid Catalyst

In the production method of the present invention, the reaction of lignin in one or more kind of the second generation ethanol fermentation residue and the second generation ethanol saccharification residue with the phenol compound is preferably performed without catalyst or in the presence of an acid catalyst in an amount of more than 0 to 3.0% by mass, and further 0.2 to 3.0% by mass, based on the total amount of the lignin and the phenol compound.

The reaction can be performed without catalyst depending on the phenol compound used for the reaction as described above. By the reaction performed without catalyst, for example, the subsequent treatment after the reaction process (purification process) can be omitted, and the enhancement of the properties, such as the flexural strength, of a molded article using the resulting lignin as a plastic material can be expected.

Examples of the acid catalyst include an inorganic acid, such as phosphoric acid, a phosphate ester, hydrochloric acid, sulfuric acid, and a sulfate ester, and an organic acid, such as acetic acid, formic acid, oxalic acid, and p-toluenesulfonic acid. The acid catalyst may be used alone or as a combination of two or more kinds thereof.

In the case where the acid catalyst is used in the reaction, the amount of the acid catalyst used with respect to the total amount of the lignin contained in the biomass residue and the phenol compound has no particular upper limit, as far as the amount is more than 0, and the reaction is generally performed in the presence of the acid catalyst in an amount of 0.01 to 3.0% by mass, preferably 0.1 to 3.0% by mass, more preferably 0.2 to 3.0% by mass, and further preferably 0.4 to 2.6% by mass, from the standpoint of the favorable exhibition of the effect of the acid catalyst added, and the impurities remaining in the modified lignin. With the use of the acid catalyst in an amount within the range, the substitution reaction can be performed favorably.

Reaction Temperature and Time

The reaction temperature is generally not particularly limited, as far as the reaction temperature is 100° C. or more, and is generally approximately more than 140° C. and 350° C. or less, preferably more than 140° C. and 300° C. or less, more preferably more than 140° C. and 270° C. or less, further preferably more than 140° C. and 250° C. or less, still further preferably 150 to 230° C., and still more further preferably 150 to 200° C. At a temperature exceeding 140° C., the phenol compound is substantially dissolved to perform the reaction, and at a temperature of 300° C. or less, the reverse reaction can be prevented from proceed.

The reaction time is generally approximately 0.1 to 15 hours, and is preferably 0.5 hour or more, and more preferably 1 hour or more, from the standpoint that the reaction can sufficiently proceed to modify the lignin, and preferably 10 hours or less, and more preferably 2 to 8 hours, from the standpoint that the progress of the reaction cannot be expected from a too long reaction time.

Solvent

The reaction of one or more kind of the second generation ethanol fermentation residue and the second generation ethanol saccharification residue with the phenol compound can be performed without solvent. One or more kind of an organic solvent, for example, an alcohol compound, such as methanol, ethanol, and isopropyl alcohol, a ketone compound, such as acetone and methyl ethyl ketone, an ether compound, such as tetrahydrofuran, and an aromatic compound, and water may be used, and one or more kind of ethanol, acetone, and water is preferably used. The reaction is preferably performed without solvent since a solvent can be prevented from being mixed in the modified lignin, and a step of removing a solvent after the reaction can be omitted.

Purification Process

The modified lignin of the present invention is produced by performing the aforementioned reaction process. Accordingly, the modified lignin-containing material obtained through the reaction process can be used directly as a plastic material, and a purification process may be performed after the reaction process.

Solid-Liquid Separation

After the reaction, the modified lignin is dissolved in the phenol compound, and the unreacted matters and the inorganic residues are present as solid matters in the liquid. These matters are preferably removed by filtration (in a hot state). For example, the reaction liquid is placed in a hot pressure filtration device having set thereto No. 5C filter paper, No. 2 filter paper, or the like, and filtered under pressure at a temperature of approximately 20 to 150° C., approximately 40 to 90° C., and generally approximately 60 to 90° C., and a pressure of approximately 0.1 to 0.99 MPa, and generally approximately 0.1 to 0.4 MPa. The filtered solid matters may be diluted and/or washed with the phenol compound, and then filtered. In the filtration, the modified lignin is contained in the filtrate. The reaction solution may be diluted and/or washed with one or more kind of a general-purpose low boiling point hydrophilic solvent, for example, a ketone compound, such as acetone and methyl ethyl ketone, an alcohol compound, such as methanol, ethanol, and isopropyl alcohol, and an ether compound, such as tetrahydrofuran, and then subjected to solid-liquid separation. In the solid-liquid separation, the modified lignin is contained in the solution.

The method of performing the solid-liquid separation is not particularly limited, and examples thereof include filtration, filter press, centrifugal separation, and dehydration.

Distillation

The distillation may be performed, for example, by subjecting the solution containing the modified lignin to distillation under pressure at a temperature of approximately 40 to 200° C., and generally approximately 80 to 150° C., under a reduced pressure of approximately 3 to 20 kPa, and generally approximately 5 to 10 kPa, so as to remove the phenol compound. In the distillation, the modified lignin is obtained as a solid matter. For example, in the case where a diluting solvent other than the phenol compound is used, the solvent other than the phenol compound may be subjected to distillation under reduced pressure at an appropriate temperature considering the boiling point of the solvent, so as to remove the general-purpose low boiling point hydrophilic solvent, and then the phenol compound may be removed in the same manner as above. In the distillation, the modified lignin is obtained as a solid matter.

Drying Under Reduced Pressure

The modified lignin obtained through the distillation may be purified by heating generally to 50 to 200° C. and vacuum-drying in a solid state or a molten state, so as to remove the phenol compound after the reaction. The modified lignin in a fluidized state under heating after the distillation may be purified by directly subjecting to the similar vacuum drying, so as to remove the phenol compound after the reaction.

Reprecipitation

In the case where the modified lignin obtained through the distillation or the drying under reduced pressure contains the phenol compound remaining, the modified lignin obtained through the distillation may be purified by dissolving in a solvent, such as acetone, and reprecipitating by adding ion exchanged water or the like as the poor solvent for the modified lignin, so as to remove the phenol compound after the reaction.

In the purification process, the filtration, the distillation, the drying under reduced pressure, and the reprecipitation each may be performed repeatedly, and one or two or more thereof may be combined.

The amount of the phenol compound remaining in the modified lignin is not particularly limited, and is generally less than 30%, preferably less than 10%, more preferably less than 5%, and further preferably less than 1%.

Modified Lignin-Containing Resin Composition Material and Molded Article

The present invention also provides a modified lignin-containing material, particularly a modified lignin-containing resin composition material, containing the modified lignin or a modified lignin produced by the production method, and a molded article using the same. In addition to the modified lignin produced by the production method, a resin component, such as a thermosetting resin and a thermoplastic resin, may be contained. The components other than the modified lignin will be described below.

Thermosetting Resin

The modified lignin containing resin composition material may further contain a thermosetting resin.

Examples of the thermosetting resin include general thermosetting resins, such as a phenol resin, an epoxy resin, a polyurethane resin, a melamine resin, a urea resin, an unsaturated polyester resin, a silicone resin, and an alkyd resin. Among these, a phenol resin is preferred since a phenol resin has a phenolic hydroxy group as similar to the modified lignin, can be reacted with the modified lignin, and can be used as a diluent for the modified lignin. In the phenol resin, a novolac phenol resin and a resol phenol resin are preferred. The thermoplastic resin may be used alone or as a combination of two or more kinds thereof.

The content of the thermosetting resin in the modified lignin-containing resin material may be determined depending on purposes, and is preferably 100 to 300 parts by mass, and more preferably 150 to 250 parts by mass, per 100 parts by mass of the modified lignin, from the standpoint of the achievement of the good properties and the good moldability.

Aldehyde Compound

The modified lignin-containing molding material may further contain an aldehyde compound.

The modified lignin-containing resin composition material that contains the modified lignin and an aldehyde compound can be a self-curing molding material.

Examples of the aldehyde compound include formaldehyde, paraformaldehyde, acetaldehyde, propionaldehyde, furfural, benzaldehyde, phenylacetaldehyde, and salicylaldehyde, and among these, formaldehyde is preferred.

The molar ratio of the phenol group and formaldehyde (formaldehyde/phenol group) contained in the modified lignin is preferably 1.0 to 2.5, and more preferably 1.2 to 2.0. In the case where the molar ratio is in the range, the curing rate in reaction can be prevented from being lowered.

An alkali is preferably used from the standpoint of the acceleration of the curing reaction of the modified lignin and the aldehyde compound. Examples of the alkali used include sodium hydroxide, potassium hydroxide, sodium carbonate, potassium carbonate, ammonia, tetramethylammonium hydroxide, and an alkylamine.

The temperature in the curing reaction of the modified lignin and the aldehyde compound and the reaction time therefor are not particularly limited, and are generally approximately 60 to 130° C., and the reaction time is generally approximately 0.5 hour to 5 hours.

The modified lignin-containing resin composition material may further contain one kind or two or more kinds selected from the thermosetting resin and the aldehyde compound in combination.

Filler

The modified lignin-containing resin composition material may further contain a filler. The filler may be either an inorganic filler or an organic filler.

Examples of the inorganic filler include spherical or crushed molten silica, silica powder, such as crystalline silica, alumina powder, glass powder, glass fibers, glass flakes, mica, talc, calcium carbonate, alumina, hydrated alumina, boron nitride, aluminum nitride, silicon nitride, silicon carbide, titanium nitride, zinc oxide, tungsten carbide, and magnesium oxide.

Examples of the organic filler include carbon fibers, aramid fibers, paper powder, wood powder, cellulose fibers, cellulose powder, rice hull powder, fruit hulls and nut powder, chitin powder, and starch.

The inorganic filler and the organic filler may be used alone or as a combination of two or more kinds thereof, and the content thereof may be determined depending on purposes. In the case where the inorganic filler and/or the organic filler is contained, the content of the inorganic filler and/or the organic filler is preferably an appropriate amount for providing good properties and good moldability. From this standpoint, the content of the inorganic filler and/or the organic filler is preferably 50 to 200 parts by mass, and more preferably 80 to 150 parts by mass, per 100 parts by mass of the modified lignin.

Curing Agent

The modified lignin-containing resin composition material may further contain a curing agent.

Examples of the curing agent include hexamethylenetetramine, hexaformaldehyde, and paraformaldehyde. These compounds may be used alone or as a combination of two or more kinds thereof.

In addition to the curing agent, a catalyst may be used for enhancing the curing rate and the curing degree, for example, an inorganic base, such as calcium hydroxide, sodium hydroxide, potassium hydroxide, calcium oxide, and magnesium oxide, a Lewis acid, such as zinc chloride and zinc acetate, and triethylamine. These compounds may be used alone or as a combination of two or more kinds thereof.

Other Additives

The resin composition material according to the present embodiment may further contain various additives added thereto in such a range that does not impair the characteristics of the molded article obtained from the resin composition material. A compatibilizer, a surfactant, and the like may also be added depending on purposes.

Examples of the compatibilizer include a resin obtained by introducing a polar group having maleic anhydride or epoxy to a thermoplastic resin, such as a maleic anhydride-modified polyethylene resin and a maleic anhydride-modified polypropylene resin, and a commercially available compatibilizer, which may be used in combination.

Examples of the surfactant include a linear fatty acid, such as stearic acid, palmitic acid, and oleic acid, and a branched or cyclic fatty acid reacted with a rosin compound, but are not limited thereto.

Examples of the additives that can be mixed in addition to the above include a flexibilizer, a thermal stabilizer, an ultraviolet ray absorbent, a flame retarder, an antistatic agent, an anti-foaming agent, a thixotropy imparting agent, a release agent, an antioxidant, a plasticizer, a stress reducing agent, a coupling agent, a dye, a light scattering agent, and a small amount of a thermoplastic resin. These compounds may be used alone or as a combination of two or more kinds thereof.

Thermoplastic Resin

The thermoplastic resin that can be mixed in the modified lignin-containing resin composition material is preferably an amorphous thermoplastic resin having a glass transition temperature of 200° C. or less or a crystalline thermoplastic resin having a melting point of 200° C. or less. Examples of the thermoplastic resin include a polycarbonate resin, a styrene resin, a polystyrene elastomer, a polyethylene resin, a polypropylene resin, a polyacrylic resin (such as a polymethyl methacrylate resin), a polyvinyl chloride resin, a cellulose acetate resin, a polyamide resin, a low melting point polyester resin, represented by a polyester having a combination of terephthalic acid and ethylene glycol, or terephthalic acid and 1,4-butanediol (such as PET and PBT), a polylactic acid and/or a copolymer containing a polylactic acid, an acrylonitrile-butadiene-styrene resin (ABS resin), a polyphenylene oxide resin (PPO), a polyketone resin, a polysulfone resin, a polyphenylene sulfide resin (PPS), a fluorine resin, a silicone resin, a polyimide resin, a polybenzimidazole resin, a polyamide elastomer, and copolymers of those resins and another monomer.

In the case where the modified lignin is used as an additive for a thermoplastic resin, the known methods described, for example, in JP 2014-15579 A and WO 2016/104634 may be used. The content of the thermoplastic resin in the modified lignin resin composition material is preferably 30% by mass or more and 99.9% by mass or less, more preferably 40% by mass or more and 99.9% by mass or less, further preferably 45% by mass or more and 99.9% by mass or less, and particularly preferably 50% by mass or more and 99.9% by mass or less, based on the total amount of the resin composition material, from the standpoint of the achievement of the significant flowability and strength.

The modified lignin-containing resin composition material may contain a resin, an additive, and a filler that are compatible with the thermoplastic resin composition material, in addition to the cellulose-containing solid matter and the thermoplastic resin.

Kneading and Molding

The components used in the modified lignin-containing resin composition material may be mixed and kneaded, for example, by a method of preliminarily mixing with a ribbon blender, a drum tumbler, or the like, and then mixing and kneading with a Henschel mixer, a Banbury mixer, a single screw extruder, a twin screw extruder, a multi-screw extruder, a roll kneader, a co-kneader, or the like. The heating temperature in kneading is generally appropriately selected in a range of 100 to 300° C.

The method of molding the modified lignin-containing resin composition material is not particularly limited. Examples thereof include a press molding method, an injection molding method, a transfer molding method, a hollow molding method, and an FRP molding method. In the case where the resin composition material is a thermoplastic resin composition material, examples of the method of molding into a prescribed shape include an extrusion molding method and an injection molding method.

Examples of the molded article using the modified lignin-containing resin composition material include an article obtained by curing a resin composition containing the modified lignin and a curing agent mixed therein, an article obtained by further mixing various fillers and an industrially produced ordinary phenol resin depending on necessity, molding into a prescribed shape, and then curing, and an article obtained by molding a resin composition material containing the modified lignin and a thermoplastic resin mixed with each other. Examples of the molded article using the modified lignin-containing resin composition material include a heat insulating material for housing, an electronic component, a resin for frac sand, a resin for coated sand, a resin for impregnation, a resin for lamination, a resin for FRP molding, an automobile component, a reinforcing material for an automobile tire, an OA equipment, a machine, an information and communication equipment, an industrial material.

The modified lignin has a potential applicability to modified lignin-containing materials, in addition to the resin composition material. Examples of the modified lignin-containing material other than the modified lignin-containing resin composition material include a carbon material, such as carbon black and carbon fibers, a lubricant, such as a grease base, antioxidative or antibacterial foods or cosmetics, a cement additive, an concrete additive, a binder, a rubber composition, a packaging material, such as a gas-barrier film, an agricultural material, such as a plant activator and a soil improver, an ink or toner, an adhesive, a surfactant, an ultraviolet ray absorbent, an electrode material for a storage battery, a growth promoter for an aquatic life, and a discoloration inhibitor for foods.

EXAMPLES

The present invention will be described more specifically with reference to examples and comparative examples, but the present invention is not limited thereto.

Calculation of Lignin Content in Second Generation Ethanol Fermentation Residue and Second Generation Ethanol Saccharification Residue (Raw Material)

The content of lignin contained in the biomass residue used in the examples was calculated by the constituent sugar analysis after subjecting to a pretreatment in the following manners. The same procedure was performed also in the case where a second generation ethanol saccharification residue was used as the raw material.

Pretreatment

As the pretreatment, the raw material as a specimen was crushed with a Wiley mill and dried at 105° C.

Constituent Sugar Analysis

A suitable amount of a specimen was weighed from the raw material, to which 72% by mass sulfuric acid was added, and allowed to stand at 30° C. for 1 hour under agitation as needed. The reaction liquid was completely transferred to a pressure tight bottle while diluting with pure water, which was treated in an autoclave at 120° C. for 1 hour, and then the filtrate and the residue were separated by filtration. The monosaccharides in the filtrate were quantitatively determined by the high-performance liquid chromatography method. The C6 polysaccharides (mainly containing glucan) were designated as cellulose, and the C5 polysaccharides (mainly containing xylan) were designated as hemicellulose.

Lignin

The residue obtained through filtration in the process of the constituent sugar analysis was dried at 105° C., and measured for the weight thereof, and the cracked residue ratio was calculated. The content of lignin was calculated by compensating for the ash content.

Properties of Modified Lignin and Raw Material Lignin

The modified lignin obtained in the examples and the raw material lignin were subjected to various measurements in the following manners.

Measurement of Molecular Weight

The modified lignin obtained in the examples or the raw material lignin was measured for the number average molecular weight (Mn), the weight average molecular weight (Mw), and the molecular weight distribution (Mw/Mn) in terms of standard polystyrene conversion molecular weight with GPC (gel permeation chromatography). The measurement device and conditions were as follows.
Separation column: "TSKgel SuperMultipore HZ-M, produced by Tosoh Corporation×2
Eluent: tetrahydrofuran
Flow amount of eluent: 1.0 mL/min
Detector: differential refractive index (RI)
Measurement temperature: 40° C.

Relative Existence Ratio of Basic Skeleton (%) and Hydroxy Group Ratio (%)

(1) A solvent containing deuterated chloroform, pyridine, and cyclohexanol (internal standard) was added to the modified lignin obtained in the examples or the raw material lignin, to which 2-chloro-4,4,5,5-tetramethyl-1,3,2-dioxaphospholane was added as derivatization reagent, and heated to 50° C. for 1 hour. Thereafter, the $^{31}$P-NMR measurement was performed in the following measurement condition.
Pulse width: 30°
Repetition time: 2 seconds
Measurement range: −60 to 200 ppm
Cumulative number: 200
Assuming that the signal derived from cyclohexanol as the internal standard was 145.2 ppm, a range of 144.0 to 142.0 ppm was identified as the S-type skeleton, a range of 141.0 to 136.6 ppm was identified as the G-type skeleton, and the relative existence ratios (%) were calculated from the integrated values. The relative existence ratio of the H-type skeleton was calculated by subtracting the relative existence ratios of the S-type skeleton and the G-type skeleton from the total aromatic hydroxy group amount.
Furthermore, a range of 150.0 to 145.5 ppm was identified as the aliphatic hydroxy group, a range of 144.7 to 136.6 ppm was identified as the aromatic hydroxy group, the aliphatic hydroxy group amount (mol/g) and the aromatic hydroxy group amount (mol/g) were calculated from the integral curve, and the hydroxy group ratios (%) thereof were obtained.

(2) Ratio of Existence Ratios and Reactive Site

The followings were calculated based on the relative existence ratios (%) of the basic skeletons.
Ratio ((2H+G)/S) of a total of twice of the relative existence ratio H (%) of the H-type skeleton and the relative existence ratio G (%) of the G-type skeleton with respect to the relative existence ratio S (%) of the S-type skeleton
Total of reactive sites (2H+G) based on the relative existence ratio H (%) of the H-type skeleton and the relative existence ratio G (%) of the G-type skeleton Softening Point (° C.)

The modified lignin obtained in the examples or the raw material lignin (solid specimen) was crushed with a mortar, from which large particles were removed with a sieve (40 mesh), and 10 to 20 mg of the crushed specimen was placed in an aluminum cup (diameter of circular upper part: 60 mm, diameter of lower part: 53 mm, depth: 15 mm). The aluminum cup having the specimen placed therein was placed on a hot plate (Asone ND-2A), and closed with a glass plate (thickness: 0.5 mm). After heating to 80° C., the temperature was increased by 10° C., and the temperature at which the specimen was melted was confirmed by visual observation through the glass plate and designated as the softening point.

Modified Lignin

Example 1

(1) Reaction Process 29.5 parts by mass of a second generation ethanol saccharification residue (lignin content: 66% by mass) (29.5 g, 19.5 g of lignin), 180 parts by mass of phenol, and 1 part by mass of phosphoric acid were placed in a 1.0 L pressure tight vessel capable of performing agitation, and heated, and the agitation was started at the time when phenol was melted. The heating was continuously performed, and the content was heated to 200° C. for 4 hours.

(2) Purification Process (2-1) Filtration

A 1.0 L hot pressure filtration device having set thereto No. 5C filter paper was fabricated and heated with warm water of 60 to 90° C. The total amount of the reaction liquid obtained in the reaction process was placed therein and filtered by pressurizing to 0.1 to 0.4 MPa with compressed air or nitrogen. The filtered solid was washed with phenol.

(2-2) Distillation

The filtrate obtained through the filtration was distilled by heating (100 to 130° C.) under reduced pressure (5 to 10 kPa) with a Kugelrohr to remove phenol, and thus 21.77 g of a modified lignin was obtained.

Phenol after the reaction was not completely removed with the Kugelrohr, and remained in an amount of 6.5% by mass with respect to the modified lignin 1. According to the result, the amount of the modified lignin obtained through the distillation was calculated as 20.3 g.

The yield was calculated as the amount of the modified lignin (20.3 g) with respect to the amount of the charged lignin (19.5 g) according to the following expression, and the yield was 104.5%. The yield may become 100% or more since the modified lignin has phenol added thereto.

Yield (%)=((modified lignin amount)/(charged lignin amount))×100

Reprecipitation 2 parts by mass of acetone was added to 1 part by mass of the modified lignin, from which phenol had been removed through distillation, (5.0 g), so as to dissolve the modified lignin therein, to which 40 parts by mass of ion exchanged water was added to precipitate the modified lignin. The precipitated modified lignin was recovered through centrifugal separation. The operation was repeated 3 or 4 times, so as to remove phenol after the reaction, and thus the modified lignin 1 (4.7 g) was obtained.

Example 2

The same procedure as in Example 1 was performed except that 78 parts by mass of phenol was used, the acid catalyst was not used, and the reaction time was 2 hours, so as to provide a modified lignin 2 (amount of modified lignin: 17.7 g, yield: 91.4%).

Example 3

The same procedure as in Example 2 was performed except that the reaction time was 4 hours, so as to provide a modified lignin 3 (amount of modified lignin: 18.9 g, yield: 97.2%).

Example 4

The same procedure as in Example 2 was performed except that the reaction temperature was 220° C., so as to provide a modified lignin 4 (amount of modified lignin: 15.8 g, yield: 80.9%).

Example 5

The same procedure as in Example 4 was performed except that the reaction time was 4 hours, so as to provide a modified lignin 5 (amount of modified lignin: 19.7 g, yield: 100.7%).

Example 6

The same procedure as in Example 2 was performed except that the reaction temperature was 230° C., so as to provide a modified lignin 6 (amount of modified lignin: 18.9 g, yield: 96.6%).

Example 7

The same procedure as in Example 2 was performed except that the reaction temperature was 250° C., so as to provide a modified lignin 7 (amount of modified lignin: 20.3 g, yield: 104.2%).

Example 8

The same procedure as in Example 7 was performed except that the reaction time was 4 hours, so as to provide a modified lignin 8 (amount of modified lignin: 23.0 g, yield: 117.7%).

Example 9

The same procedure as in Example 7 was performed except that the reaction time was 6 hours, so as to provide a modified lignin 9 (amount of modified lignin: 22.2 g, yield: 114.1%).

Example 10

The same procedure as in Example 8 was performed except that the reaction temperature was 300° C., so as to provide a modified lignin 10 (amount of modified lignin: 20.8 g, yield: 106.2%).

Example 11

The same procedure as in Example 2 was performed except that the acid catalyst was 0.2 part by mass of sulfuric acid, so as to provide a modified lignin 11 (amount of modified lignin: 18.9 g, yield: 96.9%).

Example 12

The same procedure as in Example 11 was performed except that the amount of phenol was 102 parts by mass, the reaction temperature was 220° C., and the reaction time was 1 hour, so as to provide a modified lignin 12 (amount of modified lignin: 20.5 g, yield: 104.6%).

Example 13

The same procedure as in Example 12 was performed except that the reaction time was 2 hours, so as to provide a modified lignin 13 (amount of modified lignin: 22.0 g, yield: 112.5%).

Example 14

The same procedure as in Example 12 was performed except that the reaction time was 4 hours, so as to provide a modified lignin 14 (amount of modified lignin: 23.4 g, yield: 119.7%).

Example 15

The same procedure as in Example 11 was performed except that the reaction temperature was 220° C., so as to provide a modified lignin 15 (amount of modified lignin: 20.5 g, yield: 105.2%).

Example 16

The same procedure as in Example 15 was performed except that the reaction time was 4 hours, so as to provide a modified lignin 16 (amount of modified lignin: 23.4 g, yield: 119.6%).

Example 17

The same procedure as in Example 13 was performed except that the reaction temperature was 250° C., so as to provide a modified lignin 17 (amount of modified lignin: 24.2 g, yield: 124.3%).

Example 18

The same procedure as in Example 15 was performed except that the acid catalyst was 0.4 part by mass of oxalic acid, so as to provide a modified lignin 18 (amount of modified lignin: 19.5 g, yield: 100.5%).

Example 19

The same procedure as in Example 4 was performed except that the raw material lignin was a second generation ethanol fermentation residue, so as to provide a modified lignin 19 (amount of modified lignin: 16.4 g, yield: 83.6%).

Example 20

The same procedure as in Example 19 was performed except that the reaction time was 4 hours, so as to provide a modified lignin 20 (amount of modified lignin: 16.8 g, yield: 86.3%).

Example 21

The same procedure as in Example 19 was performed except that the acid catalyst was 0.2 part by mass of sulfuric acid, so as to provide a modified lignin 21 (amount of modified lignin: 17.2 g, yield: 88.3%).

The properties of the modified lignin 1 to 21 obtained in Examples 1 to 21 were measured in the aforementioned manners. The results are shown in Tables 1 and 2.

Comparative Example 1

As Comparative Example 1, the properties of lignin in the second generation ethanol saccharification residue were analyzed, but the analysis was unable to perform by the aforementioned methods since the lignin in the second generation ethanol saccharification residue was dissolved only slightly in various organic solvents.

Reference Example 1

(1) Reference Raw Material Lignin 500 g of bagasse (dried pomace of sugarcane) was heat-treated at 200° C. for 4 hours in the presence of 2,100 mL of 1-butanol and 3,300 mL of water, and the 1-butanol layer was collected. The collected 1-butanol layer was filtered (whatman No. 2 filter paper) to remove the cellulose-containing solid matter. The filtrate was concentrated to dryness to provide 90 g of a reference raw material lignin.

(2) Reaction Process 19.5 parts by mass of the reference raw material lignin (19.5 g), 180 parts by mass of phenol, and 1 part by mass of phosphoric acid were placed in a 1.0 L pressure tight vessel capable of performing agitation, and heated, and the agitation was started at the time when phenol was melted. The heating was continuously performed, and the content was heated to 200° C. for 4 hours.

(3) Purification Process (Distillation)

The reaction liquid was taken out from the pressure tight vessel and distilled by heating (100 to 130° C.) under reduced pressure (5 to 10 kPa) with a Kugelrohr to remove phenol, and thus 29.42 g of a black solid matter (reference modified lignin) was obtained.

Phenol after the reaction was not completely removed with the Kugelrohr, and remained in an amount of 16.9% by mass with respect to the modified lignin. According to the result, the amount of the reference modified lignin was calculated as 24.5 g.

The yield was calculated as the amount of the reference modified lignin (24.5 g) with respect to the amount of the charged lignin (19.5 g) according to the following expression, and the yield was 128.9%. The yield may become 100% or more since the reference modified lignin has phenol added thereto.

Yield (%)=((recovered modified lignin)/(calculated value of charged lignin))×100

Reprecipitation

The reprecipitation was performed in the same manner as in Example 1, and a reference modified lignin 1 (4.5 g) was obtained.

The properties of the resulting reference modified lignin 1 were measured in the aforementioned manners. The results are shown in Tables 1 and 2.

Reference Example 2

As Reference Example 2, the properties of the reference raw material lignin were measured in the aforementioned manners. The results are shown in Tables 1 and 2.

TABLE 1

|  |  | Yield | Mn | Mw | Mw/Mn | Softening point (° C.) | Aliphatic hydroxy group ratio (%) | Aromatic hydroxy group ratio (%) |
|---|---|---|---|---|---|---|---|---|
| Example 1 | modified lignin 1 | 104.5% | 891 | 2159 | 2.42 | 160 | 7.75 | 92.25 |
| Example 2 | modified lignin 2 | 91.4% | 888 | 2699 | 3.04 | 190 | 15.01 | 84.99 |
| Example 3 | modified lignin 3 | 97.2% | 818 | 2381 | 2.91 | 180 | 12.70 | 87.30 |
| Example 4 | modified lignin 4 | 80.9% | 800 | 2305 | 2.88 | 160 | 10.95 | 89.05 |
| Example 5 | modified lignin 5 | 100.7% | 719 | 1788 | 2.49 | 140 | 10.93 | 89.07 |
| Example 6 | modified lignin 6 | 96.6% | 708 | 1744 | 2.46 | 140 | 12.07 | 87.93 |
| Example 7 | modified lignin 7 | 104.2% | 646 | 1416 | 2.19 | 130 | 9.51 | 90.49 |
| Example 8 | modified lignin 8 | 117.7% | 582 | 1121 | 1.93 | 110 | 8.18 | 91.82 |
| Example 9 | modified lignin 9 | 114.1% | 581 | 1112 | 1.91 | 120 | 7.21 | 92.79 |
| Example 10 | modified lignin 10 | 106.2% | 450 | 743 | 1.65 | 100 | 4.16 | 95.84 |
| Example 11 | modified lignin 11 | 96.9% | 856 | 2391 | 2.79 | 180 | 12.56 | 87.44 |
| Example 12 | modified lignin 12 | 104.6% | 873 | 2363 | 2.71 | 180 | 13.57 | 86.43 |
| Example 13 | modified lignin 13 | 112.5% | 768 | 1837 | 2.39 | 160 | 10.88 | 89.12 |
| Example 14 | modified lignin 14 | 119.7% | 885 | 1981 | 2.24 | 140 | 7.72 | 92.28 |
| Example 15 | modified lignin 15 | 105.2% | 785 | 2012 | 2.56 | 160 | 10.56 | 89.44 |
| Example 16 | modified lignin 16 | 119.6% | 745 | 1742 | 2.34 | 140 | 9.87 | 90.13 |
| Example 17 | modified lignin 17 | 124.3% | 668 | 1383 | 2.07 | 120 | 8.72 | 91.28 |
| Example 18 | modified lignin 18 | 100.5% | 816 | 2271 | 2.78 | 170 | 12.82 | 87.18 |
| Example 19 | modified lignin 19 | 83.6% | 702 | 1735 | 2.47 | 175 | 11.95 | 88.05 |
| Example 20 | modified lignin 20 | 86.3% | 671 | 1579 | 2.35 | 165 | 11.37 | 88.63 |
| Example 21 | modified lignin 21 | 88.3% | 719 | 1776 | 2.47 | 170 | 12.53 | 87.47 |
| Comparative Example 1 | comparative raw material lignin | — | unable to analyze | unable to analyze | unable to analyze | >200 | unable to analyze | unable to analyze |
| Reference Example 1 | reference modified lignin | 128.9% | 740 | 1331 | 1.80 | 140 | 4.05 | 95.95 |
| Reference Example 2 | reference raw material lignin | — | 1271 | 2676 | 2.11 | 170 | 19.11 | 80.89 |

TABLE 2

|  |  | H nucleus | G nucleus | S nucleus | ((2H+G)/S) | (2H+G) |
|---|---|---|---|---|---|---|
| Example 1 | modified lignin 1 | 3.66 | 76.08 | 20.26 | 4.117 | 83.405 |
| Example 2 | modified lignin 2 | 3.80 | 73.37 | 22.83 | 3.548 | 80.978 |
| Example 3 | modified lignin 3 | 3.45 | 74.11 | 22.43 | 3.611 | 81.017 |
| Example 4 | modified lignin 4 | 3.73 | 74.31 | 21.95 | 3.725 | 81.779 |
| Example 5 | modified lignin 5 | 3.24 | 75.93 | 20.83 | 3.956 | 82.410 |
| Example 6 | modified lignin 6 | 3.82 | 74.81 | 21.37 | 3.859 | 82.455 |
| Example 7 | modified lignin 7 | 3.64 | 76.74 | 19.62 | 4.284 | 84.025 |
| Example 8 | modified lignin 8 | 3.17 | 79.01 | 17.82 | 4.789 | 85.346 |
| Example 9 | modified lignin 9 | 3.30 | 79.20 | 17.49 | 4.906 | 85.812 |
| Example 10 | modified lignin 10 | 2.67 | 85.30 | 12.03 | 7.538 | 90.647 |
| Example 11 | modified lignin 11 | 3.39 | 76.24 | 20.37 | 4.077 | 83.028 |
| Example 12 | modified lignin 12 | 4.35 | 73.68 | 21.98 | 3.748 | 82.371 |
| Example 13 | modified lignin 13 | 3.85 | 75.81 | 20.34 | 4.106 | 83.515 |
| Example 14 | modified lignin 14 | 2.73 | 75.45 | 21.82 | 3.708 | 80.909 |
| Example 15 | modified lignin 15 | 3.37 | 77.11 | 19.52 | 4.296 | 83.855 |
| Example 16 | modified lignin 16 | 3.58 | 76.41 | 20.01 | 4.176 | 83.571 |
| Example 17 | modified lignin 17 | 3.25 | 78.67 | 18.08 | 4.710 | 85.168 |
| Example 18 | modified lignin 18 | 3.99 | 73.82 | 22.19 | 3.687 | 81.800 |
| Example 19 | modified lignin 19 | 3.99 | 73.82 | 22.19 | 3.687 | 81.800 |
| Example 20 | modified lignin 20 | 3.58 | 82.39 | 14.03 | 6.384 | 89.554 |
| Example 21 | modified lignin 21 | 3.88 | 81.50 | 14.62 | 6.103 | 89.256 |
| Comparative Example 1 | comparative raw material lignin | unable to analyze | unable to analyze | unable to analyze | unable to analyze | unable to analyze |
| Reference Example 1 | reference modified lignin | 3.11 | 76.67 | 20.22 | 4.099 | 82.889 |
| Reference Example 2 | reference raw material lignin | 5.19 | 63.98 | 30.84 | 2.411 | 74.352 |

Tables 1 and 2 showed that the modified lignin of Examples had an applicability as a modified lignin-containing material, particularly a resin composition material, since the molecular weight and the composition thereof were improved.

The yield of Reference Example 1 is 128.9%, from which it is considered that the increment of 28.9% is the addition of phenol through the reaction since the isolated lignin is used originally. The isolated yields of Examples are not up to Reference Example 1, which is however based on the calculated lignin (including polymers), and the actual isolated yield is necessarily further analyzed. However, the second generation ethanol saccharification residue cannot be used directly as a resin composition material, whereas the modified lignin capable of being used actually as a resin composition material can be obtained by the production method of the present invention. Furthermore, the yields of the modified lignin are larger than the amount of lignin used in some cases of Examples, and thus a high yield can also be achieved.

Cured Product

In the following examples, resin composition materials and molded articles using the same were produced by using the modified lignin 1, 15, 17, and 21 of Examples 1, 15, 17, and 21, the second generation ethanol saccharification residue as the raw material (comparative raw material lignin), the reference modified lignin of Reference Example 1, and the reference raw material lignin of Reference Example 2.

The resin composition materials and the molded articles were evaluated in the following manners.

Kneading Capability

In Examples 22 to 25, Comparative Example 2, and Reference Examples 3 and 4, the kneading capability was evaluated based on the following index.
A: readily kneadable
B: kneadable with difficulty
C: not kneadable Agitation Capability In Examples 26 to 29, Comparative Example 3, and Reference Examples 5 and 6, the agitation capability in reaction was evaluated based on the following index.
A: readily agitatable
B: agitatable with difficulty
C: not agitatable Flexural Strength A specimen of 5 mm×50 mm×1 mm was cut out from each of the molded articles obtained in the examples was measured for the flexural strength with Instron 5566, produced by Instron Japan Co., Ltd., under conditions of a three-point flexural mode, a span of 30 mm, and a speed of 2 mm/min, and evaluated by the index.

A: specimen difficulty broken
B: specimen broken
C: specimen immediately broken
-: molding failure Examples 22 to 25

100 parts by mass of a novolac phenol resin (PR-53195, produced by Sumitomo Bakelite Co., Ltd.), 50 parts by mass of wood powder, 50 parts by mass (50.0 g) of each of the modified lignin 1, 15, 17, and 21 of Examples 1, 15, 17, and 21, 20 parts by mass of hexamethylenetetramine as a curing agent, and 1 part of zinc stearate as an internal release agent were mixed and kneaded with a two-roll kneader at 100 to 110° C. for 3 minutes, so as to provide a modified lignin-containing resin composition material.

The resulting modified lignin-containing resin composition material was pressed into a cavity of a heated mold, and molded by a transfer molding method under molding conditions of 170° C. and 5 minutes, followed by curing in an oven at 180° C. for 8 hours, so as to provide a molded article.

The evaluation results of the resin composition materials and the molded articles are shown in Table 3.

Comparative Example 2

The same procedure as in Example 22 was performed except that the second generation ethanol saccharification residue as the raw material (comparative raw material lignin) was used instead of the modified lignin, so as to provide a resin composition material and a molded article.

The evaluation results of the resin composition material and the molded article are shown in Table 3.

Reference Example 3

The same procedure as in Example 25 was performed except that the reference modified lignin was used instead of the modified lignin, so as to provide a resin composition material and a molded article.

The evaluation results of the resin composition material and the molded article are shown in Table 3.

Reference Example 4

The same procedure as in Example 25 was performed except that the reference raw material lignin was used instead of the modified lignin, so as to provide a resin composition material and a molded article.

The evaluation results of the resin composition material and the molded article are shown in Table 3.

TABLE 3

|  | Example 22 | Example 23 | Example 24 | Example 25 | Comparative Example 2 | Reference Example 3 | Reference Example 4 |
| --- | --- | --- | --- | --- | --- | --- | --- |
| Lignin | modified lignin 1 | modified lignin 15 | modified lignin 17 | modified lignin 21 | comparative raw material lignin | reference modified lignin | reference raw material lignin |
| Kneading capability | A | A | A | A | C | A | A |
| Flexural strength | A | A | A | A | — | A | B |

Examples 26 to 29

In a 0.5 L separable flask equipped with a reflux condenser and agitation blades, 50 parts by mass (50.0 g) of each of the modified lignin 1, 15, 17, and 21 of Examples 1, 15, 17, and 21, and 30 parts by mass of a 40% by mass formaldehyde aqueous solution were added and agitated. The molar ratio of formaldehyde and phenol in the modified lignin was 1.5. While 35 parts by mass of a 50% by mass sodium carbonate aqueous solution was gradually added dropwise thereto, the mixture was heated to 100° C. for 2 hours to provide a liquid composition.

54 parts by mass of wood powder was further added thereto, and the mixture was agitated until uniform, so as to provide a modified lignin-containing resin composition material.

The resulting modified lignin-containing resin composition material was depressurized to remove water, and press molded at a surface pressure of 0.2 MPa, 180° C., and 10 minutes, followed by curing in an oven at 200° C. for 4 hours, so as to provide a molded article.

The evaluation results of the resin composition materials and the molded articles are shown in Table 4.

Comparative Example 3

The same procedure as in Example 26 was performed except that the second generation ethanol saccharification residue as the raw material (comparative raw material lignin) was used instead of the modified lignin, so as to provide a resin composition material and a molded article.

The evaluation results of the resin composition material and the molded article are shown in Table 4.

Reference Example 5

The same procedure as in Example 26 was performed except that the reference modified lignin was used instead of the modified lignin, so as to provide a resin composition material and a molded article.

The evaluation results of the resin composition material and the molded article are shown in Table 4.

Reference Example 6

The same procedure as in Example 26 was performed except that the reference raw material lignin was used instead of the modified lignin, so as to provide a resin composition material and a molded article.

The evaluation results of the resin composition material and the molded article are shown in Table 4.

equivalent to Reference Examples 3 and 5 using the reference modified lignin is obtained.

INDUSTRIAL APPLICABILITY

The modified lignin of the present invention has a decreased molecular weight to enhance the mixing capability with another plastic material, and the reactive sites are increased. The enhancement of the properties of the molded article is expected due to the enhancement of the mixing capability and the increase of the reactive sites, and furthermore the easiness in mixing can omit the necessity of a costly extensive equipment in the production of a cured member. Moreover, lignin, most of which has been discarded, can be beneficially used, which is effective for the environmental preservation.

The invention claimed is:

1. A method for producing a modified lignin, comprising reacting one or more kind of a second generation ethanol fermentation residue and a second generation ethanol saccharification residue, with a phenol compound wherein the one or more kind of a second generation ethanol fermentation residue and a second generation ethanol saccharification residue are not an isolated lignin, wherein the reaction is performed at a reaction temperature of more than 140° C. and 350° C. or less.

2. The method for producing a modified lignin according to claim 1, wherein an amount (mass) of the resulting modified lignin is larger than an amount (mass) of lignin in one or more kind of the second generation ethanol fermentation residue and the second generation ethanol saccharification residue.

3. The method for producing a modified lignin according to claim 1, wherein the phenol compound has a hydrogen atom at least one of the 2-position, the 4-position, and the 6-position as positions of substituents with respect to the hydroxy group.

4. The method for producing a modified lignin according to claim 1, wherein the phenol compound is a compound represented by the following formula (1):

TABLE 4

| | Example 26 | Example 27 | Example 28 | Example 29 | Comparative Example 3 | Reference Example 5 | Reference Example 6 |
|---|---|---|---|---|---|---|---|
| Lignin | modified lignin 1 | modified lignin 15 | modified lignin 17 | modified lignin 21 | comparative raw material lignin | reference modified lignin | reference raw material lignin |
| Agitation capability | A | A | A | A | C | A | A |
| Flexural strength | A | A | A | A | — | A | B |

It is understood from Tables 3 and 4 that the second generation ethanol saccharification residue as the raw material cannot be used directly as a resin composition material, whereas the modified lignin obtained by the present invention is improved in mixing capability since the excellent kneading capability and the excellent agitation capability in reaction equivalent to the reference modified lignin are obtained. It is also understood that as for the flexural strength of the molded articles obtained in Examples, the molded articles have good properties since the evaluation

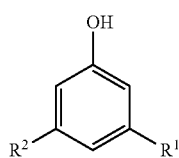

(1)

wherein R$^1$ and R$^2$ each independently represent a hydrogen atom, a hydroxy group, or an alkyl group having 1 to 15 carbon atoms, and R$^1$ and R$^2$ may be the same as or different from each other.

5. The method for producing a modified lignin according to claim 1, wherein the reaction is performed without catalyst or in the presence of an acid catalyst in an amount of more than 0 to 3.0% by mass based on the total amount of lignin in one or more kind of the second generation ethanol fermentation residue and the second generation ethanol saccharification residue and the phenol compound.

6. The method for producing a modified lignin according to claim 5, wherein the acid catalyst is selected from the group consisting of phosphoric acid, phosphate ester, hydrochloric acid, acetic acid, formic acid, oxalic acid, and p-toluenesulfonic acid.

7. The method for producing a modified lignin according to claim 1, wherein the reaction is performed without catalyst or in the presence of an acid catalyst in an amount of 0.2 to 3.0% by mass based on the total amount of lignin in one or more kind of the second generation ethanol fermentation residue and the second generation ethanol saccharification residue and the phenol compound.

8. The method for producing a modified lignin according to claim 1, wherein a mass ratio of the phenol compound with respect to lignin in one or more kind of the second generation ethanol fermentation residue and the second generation ethanol saccharification residue (phenol compound/lignin) is 1 to 15.

9. The method for producing a modified lignin according to claim 1, wherein the reaction is performed at a reaction temperature of more than 140° C. and 250° C. or less.

10. The method for producing a modified lignin according to claim 1, wherein the reaction is performed for a reaction time of 1 hour or more and 8 hours or less.

11. The method for producing a modified lignin according to claim 1, wherein the method further comprises solid-liquid separation.

12. The method for producing a modified lignin according to claim 11, wherein the solid-liquid separation includes filtering the reaction liquid obtained in the reaction process to separate the modified lignin into the filtrate.

* * * * *